(12) United States Patent
Moulsley et al.

(10) Patent No.: US 9,276,714 B2
(45) Date of Patent: *Mar. 1, 2016

(54) METHOD FOR SIGNALLING A PRECODING IN A COOPERATIVE BEAMFORMING TRANSMISSION MODE

(71) Applicant: KONINKLIJKE PHILIPS N.V., Eindhoven (NL)

(72) Inventors: Timothy James Moulsley, Caterham (GB); Choo Chiap Chiau, Cambridge (GB)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/053,706

(22) Filed: Oct. 15, 2013

(65) Prior Publication Data

US 2014/0044209 A1 Feb. 13, 2014

Related U.S. Application Data

(63) Continuation of application No. 12/896,085, filed on Oct. 1, 2010, now Pat. No. 8,634,779.

(30) Foreign Application Priority Data

Oct. 5, 2009 (EP) ..................................... 09172194

(51) Int. Cl.
*H04W 4/00* (2009.01)
*H04L 5/00* (2006.01)
(Continued)

(52) U.S. Cl.
CPC .............. *H04L 5/0035* (2013.01); *H04B 7/024* (2013.01); *H04B 7/04* (2013.01); *H04B 7/0456* (2013.01);
(Continued)

(58) Field of Classification Search
CPC ........ H04W 28/04; H04W 72/04; H04W 4/00
USPC ........ 455/63.1, 450, 422.1, 16, 17, 19, 67.11, 455/67.13, 226.1; 370/329
See application file for complete search history.

(56) References Cited

U.S. PATENT DOCUMENTS

2008/0080459 A1* 4/2008 Kotecha et al. ............... 370/342
2008/0153428 A1 6/2008 Han et al.
(Continued)

FOREIGN PATENT DOCUMENTS

WO 2009084877 A1 7/2009

OTHER PUBLICATIONS

Texas Instruments, "Aspects of Coordinated Multi-Point Transmission for Advanced E-UTRA", 3GPP TSG RAN WG1 #54BIS, R1-083530, Prague, Czech Republic, Sep. 29-Oct. 3, 2008, pp. 1-5.

*Primary Examiner* — Temica M Beamer

(57) ABSTRACT

The present invention relates to a method for operating a secondary station in a network, the secondary station comprising a transceiver adapted for simultaneously receiving transmissions from a primary station controlling a first cell and at least one primary station controlling a second cell, the method comprising the secondary station
 (a) selecting a first precoding matrix for the first cell out a primary set of precoding matrices for the first cell,
 (b) selecting a subset of at least one precoding matrix for the at least one second cell in dependence on the first precoding matrix, out of a set of subsets of precoding matrices for the second cell,
 (c) selecting a second precoding matrix for the at least one second cell out of the selected subset of precoding matrices for the second cell,
 (d) transmitting a first indicator representative of the first precoding matrix.

32 Claims, 10 Drawing Sheets

(51) Int. Cl.
 *H04B 7/02* (2006.01)
 *H04B 7/06* (2006.01)
 *H04B 7/04* (2006.01)
 *H04L 25/03* (2006.01)

(52) U.S. Cl.
 CPC ............ *H04B 7/0486* (2013.01); *H04B 7/0617* (2013.01); *H04B 7/0634* (2013.01); *H04B 7/0639* (2013.01); *H04B 7/0641* (2013.01); *H04L 25/03891* (2013.01)

(56) References Cited

U.S. PATENT DOCUMENTS

| | | |
|---|---|---|
| 2008/0233902 A1 | 9/2008 | Pan et al. |
| 2009/0181708 A1 | 7/2009 | Kim et al. |
| 2009/0207822 A1 | 8/2009 | Kim et al. |
| 2010/0035555 A1 | 2/2010 | Bala et al. |
| 2010/0303034 A1 | 12/2010 | Chen et al. |
| 2010/0322176 A1 | 12/2010 | Chen et al. |

\* cited by examiner

METHOD FOR SIGNALLING A PRECODING IN A COOPERATIVE BEAMFORMING TRANSMISSION MODE

This application claims the benefit or priority of and describes relationships between the following applications: wherein this application is a continuation of U.S. patent application Ser. No. 12/896,085, filed Oct. 2, 2010, which claims the priority of foreign application EP09172194.4 filed Oct. 5, 2009, all of which are incorporated herein in whole by reference.

The present invention relates to a method of communication in a communication system like a mobile communication system, for example UMTS, LTE or LTE Advanced.

More specifically, the invention relates to a method of communication using beamforming and, in some exemplary embodiments of the invention, cooperative beamforming, i.e. beamforming obtained by using primary station antennas from different cells.

In a cellular telecommunication system, a plurality of user terminals within a cell communicate with a primary station. With the subsequent generations of cellular systems, the achievable data rate has been keeping increasing. In advanced systems such as UMTS and LTE, multi-antenna transmission/reception techniques variously described as, MIMO, precoding or beamforming are supported for transmissions from a single cell to a mobile terminal. Thanks to the spatial selectivity of the beamforming mode, such transmission modes have enabled an important increase of the achievable data rate and of the range of communication, while maintaining the average interference level.

In order to achieve the beamforming, a typical transmitting station having an antenna array applies a set of complex coefficients (forming a precoding matrix or precoding vector) to a signal transmitted from its respective antennas, so that the transmission stream is spatially directed towards a receiving station. However, reception of such a beamformed transmission may require the communication of this set of complex coefficients between the transmitting station and the receiving station. In implementations of such systems, precoding codebooks are defined. These precoding codebooks may be viewed as a way of describing precoding matrix (or precoding vector) of the channel coefficients or precoding weights in a compact way, thereby reducing the amount of required signaling for indicating the precoding. These codebooks also enable the user terminal (defined in LTE as a User Equipment or UE) to report to the network a preferred precoder for downlink transmission, in the form of an index to codebook entry. In this case, the preferred precoder is a set of complex coefficients to be applied to transmit antennas of the base station (defined in LTE as an eNodeB). Similarly, precoding codebooks may also be used by the base station to signal the precoding used for a transmission to the user terminal. This enables the user terminal to derive an appropriate phase/amplitude reference from common pilot symbols for demodulation of each downlink transmission.

In LTE, this signaled codebook index is referred to as PMI (Precoding Matrix Indicator). Typically, the same codebook may be used on one hand to signal to a user terminal the precoding vector or matrix which is actually applied in the downlink by a base station and on the other hand to feed back the preferred precoding matrix by the user terminal to enable a phase/amplitude reference to be derived. Alternatively, the reference(s) may be provided by precoded reference symbols (i.e. dedicated reference symbols).

Recently, it has been proposed to use cooperative beamforming, i.e. beamforming using antennas from multiple cells or multiple base station sites (under the description of CoMP or Co-operative Multi-Point transmission). Such systems are introduced on FIGS. 1 to 3. In such a system, a user terminal 110 within a serving cell 101a communicates in normal (i.e. single cell) mode with a primary station 100a. In normal beamforming mode, the primary station 100a applies a set of precoding weights to the signal to be transmitted from its transmit antennas 104a to create a spatial stream 105a directed towards the user terminal 110.

In a cooperative beamforming mode, a second primary station 100b in a neighboring cell 101b uses some of its antennas 104b to transmit in a cooperative way the same signal 105b as the one 105a transmitted by the primary station 100a to the user terminal 110. The spatial stream now comprises two components 105a and 105b. As explained above, the user terminal 110 needs to feed back a channel state estimate based on measurements on received reference symbols. This estimate in this example is an indication of a preferred precoding matrix (or vector if there is only one transmission stream) in the form of a codebook index.

As illustrated on FIG. 1, it may be possible to report a PMI for each co-operating cell, i.e. the user terminal signals transmits an indication of a first preferred precoding matrix 111a for the serving cell 101a to the primary station 100a and an indication of a second preferred precoding matrix 111b for the cell 101b to the primary station 100b. Thus, the base stations 100a and 100b may use different precoding in order to have a fine adjustment of the transmission beam. This means that the user terminal needs to feed back as many PMIs as there are cooperating cells. This may represent a great amount of signaling and overhead.

In order to reduce this signaling, as illustrated on FIG. 2, it could be possible that the user terminal 110 transmits only one PMI to the cooperating cells base stations 100a and 100b. On FIG. 2, the user terminal 110 makes an estimate of the received transmission channels by means of measurements on reference symbols, and establishes one PMI 112 which is transmitted to both base stations 100a and 100b. This means that the base station 100a and the base station 100b apply the same precoding. Thus, the drawback of this is a lack of flexibility. Moreover, in case of more than two cooperating cells, it may be difficult to obtain an efficient beamforming.

Another approach illustrated on FIG. 3, may be described as SFN with antenna selection. Here SFN is "single frequency network", which implies that the same signal is transmitted from more than one cell. The user terminal 110 reports a value of precoding matrix 113a which is to be applied by all the co-operating cells 101a and 101b. Additionally the user terminal 110 signals in a further signaling message 113b whether particular antennas should be switched off. This means that the remaining antennas are "selected". In a typical implementation of this technique for the case of 4 transmit antennas per cell, up to one antenna may be switched off per cell. The user terminal then needs to search the possible combinations of PMI and antenna selection for the one which will give the highest data rate.

This permits some more flexibility in the adjustment of the precoding. However, the antenna selection feedback needs some data. For instance, in the above example, the antenna selection for one cell needs at least 3 bits (four different antenna values and the case where no antenna is switched off). This means that this causes overhead and still a significant amount of signaling. Moreover, this may lead for some base stations to a potential power imbalance between the different antennas. This may thus reduce the total available power to that provided by the remaining on antennas, and this would affect the achievable transmit data rate.

It is an object of the invention to propose a method for operating a telecommunication system which alleviates the above described problems.

It is another object of the invention to propose a method for operating a secondary station which proposes a good tradeoff between amount of signaling and flexibility of the precoding.

To this end, in accordance with an aspect of the invention, a method is proposed for operating a secondary station in a network, the secondary station comprising a transceiver adapted for simultaneously receiving transmissions from a primary station controlling a first cell and at least one primary station controlling a second cell, the method comprising the secondary station (a) selecting a first precoding matrix for the first cell out a primary set of precoding matrices for the first cell, (b) selecting, in dependence on the first precoding matrix in accordance with a precoding scheme, a subset out of a secondary set of precoding matrices for the second cell, the subset consisting of at least one precoding matrix for the second cell, (c) selecting a second precoding matrix for the at least one second cell out of the selected subset of precoding matrices for the second cell, (d) transmitting a first indicator representative of the first precoding matrix.

In accordance with a second aspect of the invention, it is proposed a secondary station comprising a transceiver adapted for simultaneously receiving transmissions from a primary station controlling a first cell and at least one primary station controlling a second cell, the secondary station further comprising control means for selecting a first precoding matrix for the first cell out a primary set of precoding matrices for the first cell, for selecting a subset of precoding matrices for the second cell in dependence on the first precoding matrix out of a set of subsets of precoding matrices for the second cell, and for selecting a second precoding matrix for the second cell out of the subset of precoding matrices for the second cell, the transceiver being arranged for transmitting a first indicator representative of the first precoding matrix and a second indicator representative of the second precoding matrix.

As a consequence, the secondary station may signal a single first precoding matrix indicator and keep a certain amount of flexibility in the choice of precoding for the second precoding matrix. It is also possible for the secondary station to signal information upon the second precoding matrix by means of a second indicator representative of the second precoding matrix. But since the choice of precoding for the second precoding matrix is limited to a subset, the amount of data required for the second indicator is reduced.

Moreover, in an embodiment of the invention, the second precoding matrix represented by the second indicator is based on the value of the first indicator, so that the amount of data used for transmitting the second indicator is less than the amount of data used for transmitting the first indicator. Indeed, the values of the second precoding matrix are limited in accordance with the value of the first precoding matrix. This thus enables the use of a small or reduced second indicator in terms of data bits, because the possible values of the second indicator is limited to a subset of values. This permits flexibility without requiring too much additional signaling in terms of data bits.

In accordance with this aspect of the invention, at step (b), the subset of precoding matrices is selected in accordance with a precoding scheme. Thus, it is possible to firstly select a precoding scheme convenient for the particular conditions and topology of the network (e.g. whether the cells are served by a single primary station or by different primary station, or whether the signals from the two cells are identical or not), signal the selected precoding scheme beforehand, and then apply this precoding scheme according to which a value of first precoding matrix for the first cell leads to a restricted subset of second precoding matrices for the second cell. Thus, even if the flexibility is restricted to a subset of values for the second precoding matrix, this ensures though that the restricted values are suitable for the situation experienced by the secondary station.

In accordance with a variation of the above variant of the first embodiment, the selected precoding scheme is generated by the secondary station on the basis of statistics recorded by the secondary station on combinations of a precoding matrix selected from a codebook for the first cell and a precoding matrix selected from a codebook for the second cell. Such a precoding scheme is thus adapted and suitable for the situation experienced by the secondary station. It ensures that the limited flexibility avoids restricting the secondary station to unsuitable precoding matrix values.

The present invention also relates to a method for operating a secondary station in a network, the secondary station comprising a transceiver adapted for simultaneously receiving transmissions from a primary station controlling a first cell and at least one primary station controlling a second cell, the method comprising the secondary station signaling a first precoding matrix indicator representative of a first precoding matrix for the first cell and a second precoding matrix indicator representative of a second precoding matrix for the second cell, wherein the amount of data used for the second indicator is less than the amount of data used of the first indicator.

In accordance with a third aspect of the invention, a method is proposed for operating a primary station in a network, the primary station being arranged for operating a first cell, the primary station comprising a first transceiver adapted for transmitting transmissions in cooperation with at least a transceiver of primary station dedicated to a second cell, the method comprising the primary station (a) selecting a first precoding matrix for the first cell out a primary set of precoding matrices for the first cell, (b) selecting, in dependence on the first precoding matrix in accordance with a precoding scheme, a subset out of a secondary set of precoding matrices for the second cell, the subset consisting of at least one precoding matrix for the second cell, (c) selecting a second precoding matrix for the at least one second cell out of the selected subset of precoding matrices for the second cell, (d) transmitting a first indicator representative of the first precoding matrix to the secondary station.

In accordance with a fourth aspect of the invention, it is proposed a primary station comprising a transceiver for operating a first cell, said transceiver being adapted for transmitting transmissions in cooperation with at least a transceiver of primary station dedicated to a second cell, the primary station being arranged for selecting a first precoding matrix for the first cell out a primary set of precoding matrices for the first cell, for selecting a subset of at least one precoding matrix for the at least one second cell in dependence on the first precoding matrix, out of a set of subsets of precoding matrices for the second cell, for selecting a second precoding matrix for the at least one second cell out of the selected subset of precoding matrices for the second cell, and the transceiver of the primary station being arranged for transmitting a first indicator representative of the first precoding matrix to the secondary station.

These and other aspects of the invention will be apparent from and will be elucidated with reference to the embodiments described hereinafter.

The present invention will now be described in more detail, by way of example, with reference to the accompanying drawings, wherein:

FIG. 1-3; already described, are block diagrams of architectures that have been discussed in 3GPP.

This invention relates to a telecommunication system comprising a plurality of cells, each cell being controlled by a primary station, said primary station being able to communicate with secondary stations that are within the cell. Such a system will be detailed with reference to the system depicted on FIG. 4.

Figure 4:
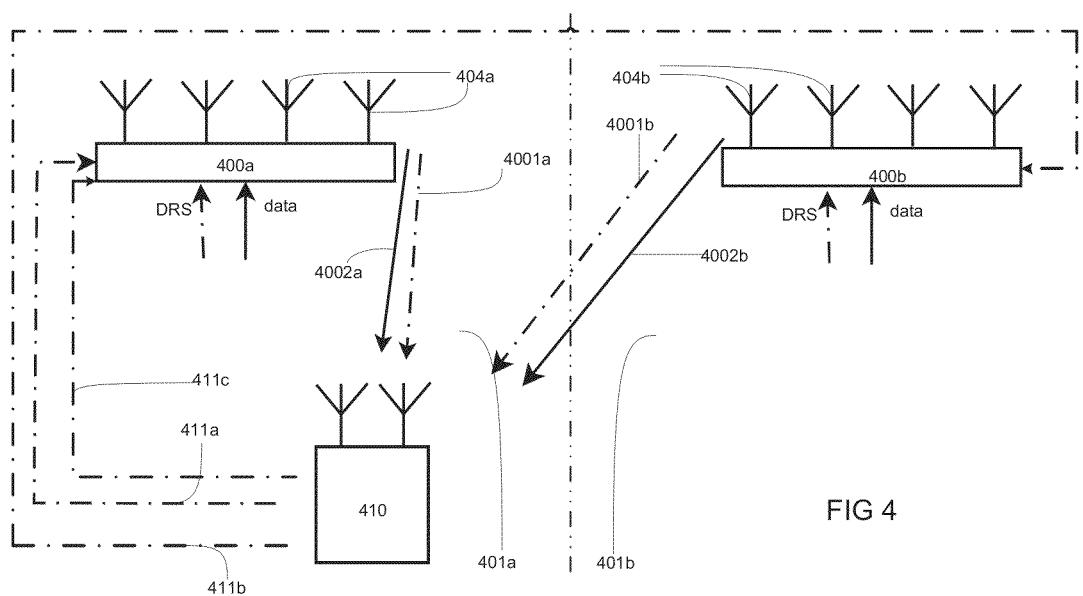
FIG. 4 is a block diagram of a communication system in accordance with a first embodiment of the invention.

As shown on FIG. 4, a secondary station 410 contained in cell 401a communicates with a primary station 400a. In an exemplary embodiment of the invention, such a telecommunication system operates under the UMTS specifications or LTE specifications. Accordingly, the primary station 400 a may be an eNodeB and the secondary station 410 is a User Equipment (UE). A second cell 401b neighbouring cell 401a is represented on FIG. 4. This cell 401b is controlled by a primary station 400b. On FIG. 4, the primary stations 401a and 401b are represented as two different primary stations, however, it should be noted that it is possible that a single primary station may control a plurality of cells (usually three in current networks).

For the sake of clarity only one secondary station is represented, however, a plurality of secondary stations may be within a cell.

Each primary station 400a and 400b comprises an antenna array 404a and 404b respectively having a plurality of antennas, in this example four antennas per cell. In accordance with a cooperative beamforming mode, the secondary station 410 may receive signals from its cell primary station 400a and from neighboring cells primary stations, in this example from primary station 400b. The primary stations 400a and 400b transmit to the secondary station 410 by using each set of respective precoding coefficients a respective data stream 4002a and 4002b and respective sets of reference symbols 4001a and 4001b. In this cooperative beamforming mode, the data streams are identical. Therefore the two data streams 4002a and 4002b can be considered as a single joint transmission. In another cooperative beamforming mode the data streams may be different. The reference symbols 4001a and 4001b may be used by the secondary station 410 for decoding efficiently the data streams 4002a and 4002b. On the basis of these reference symbols 4001a and 4001b, or on other reference symbols embedded in the downlink channels transmitted by the primary stations 400a and 400b, the secondary station 410 estimates channel coefficients in order to establish a preferred precoding matrix for the respective cells.

In accordance with a first embodiment of the invention, the secondary station 410, based on the estimation of the channel coefficients, chooses a first preferred precoding matrix in a primary codebook for the cell 401a. The secondary station 410 uses the primary codebook to extract an index that may then be signaled to the first cell 401a by means of a signaling message 411a.

Furthermore, the secondary station may choose in this first embodiment a preferred precoding matrix for the second cell 401b out of a secondary precoding codebook. This secondary precoding codebook is a limited codebook in the sense that it contains a subset of precoding matrices, namely a limited number of precoding matrices (e.g. 1, 2, or more but less than the total number of the conventional set of available precoding matrices for a conventional secondary codebook). This secondary codebook depends on the value of the preferred precoding matrix for the first cell 401a, or on the value of the index to be signaled in the signaling message 411a. The signaling messages may be signaled on an uplink control channel like PUSCH or PUCCH in LTE.

If the number of entries contained in the secondary codebook is more than one, an index to the secondary codebook entry is signaled in a signaling message 411b. However, it is to be noted that in variation of this embodiment this second cell precoding matrix is uniquely determined by the first cell precoding matrix and does not need to be signaled (e.g. it may have the same value). In this first embodiment of the invention, the signaling messages 411a and 411b are signaled respectively to primary stations 400a and 400b. However, in a variant of this embodiment, both signaling messages 411a and 411b are signaled to at least one of primary stations 400a and 400b, e.g. the primary station of the serving cell; hence primary station 400a. Then, the primary station 400a may retransmit the signaling message to the second primary station 400b, or compute the precoding coefficients for the two primary stations, and forward the precoding coefficients to the primary station 400b. In addition, the computed precoding coefficients or information about the coefficients may be forwarded to the secondary station. This could be in the form of explicit signaling or by means of precoded reference symbols.

This embodiment of the invention addresses some problems of the prior art, which are the number of bits to send multiple precoding matrix indexes (i.e. signaling overhead) in the messages from the secondary station 410 to the network, i.e. to the primary station 400a and/or 400b, and the computational complexity at the secondary station of searching all possible combinations of precoding matrix index for each cell for the highest bit rate, or the computational complexity of searching a single large codebook covering all the cooperating cells.

Figure 1:
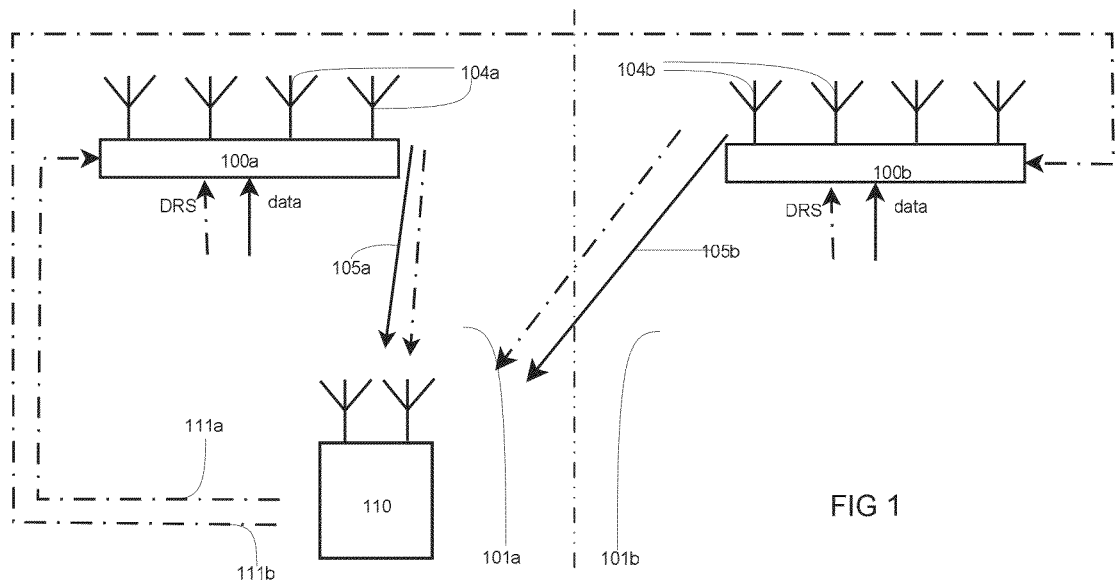
Figure 2:
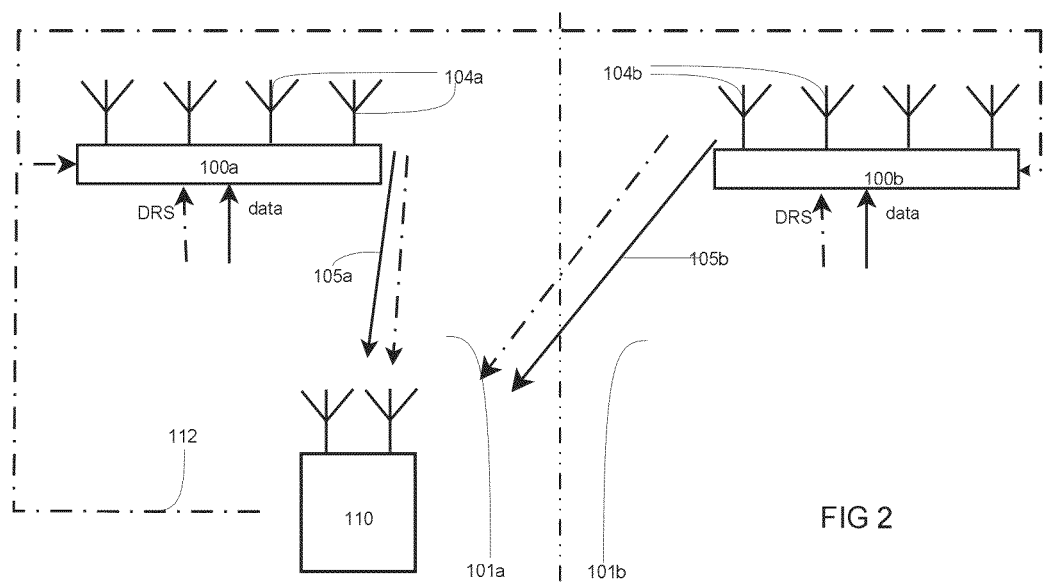
Figure 3:
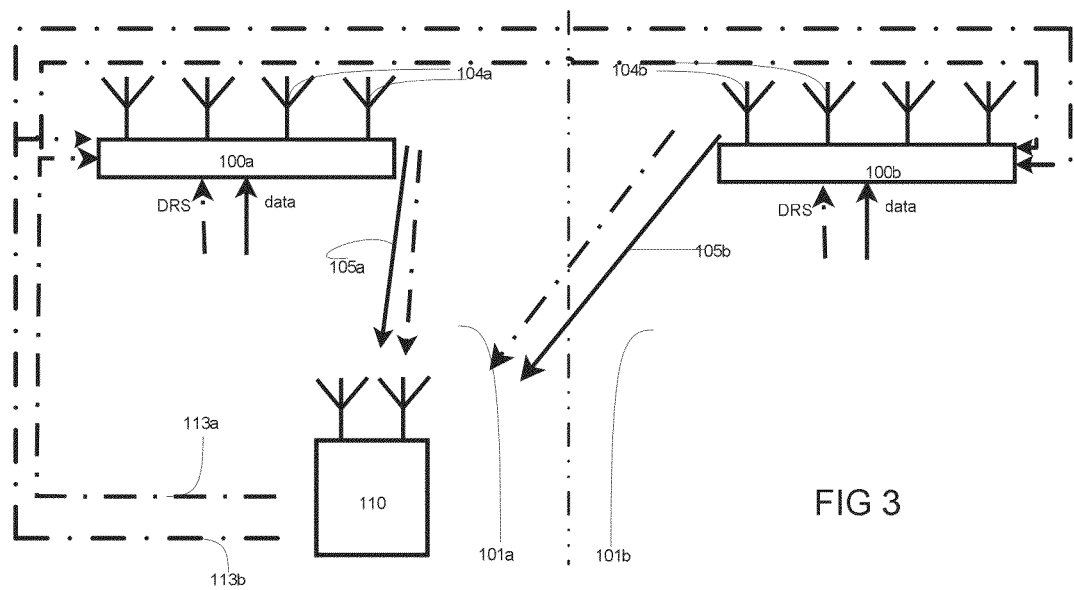

It also aims to offer more flexibility in choice of codebook entries and potentially better performance with reasonable computational complexity and signaling overhead, in comparison with systems like the one illustrated on FIG. 2.

This first embodiment of the invention is based on the recognition that the radio channels from different access points/cells to a given secondary station are likely to have some properties which are correlated. These correlated properties are established by means of precoding scheme giving the correspondence between the values of the primary codebook and the subsets of precoding matrices of the secondary codebook. In order that the primary stations of the cells 401a and 401b know the correspondence between the primary codebook and the secondary codebook, the secondary station signals beforehand a correspondence matrix by means of the signaling message 411c. Alternatively, a precoding scheme can be pre-established and known in advance from both the primary station and the secondary station. In a preferred example of this first embodiment, the signaling message 411c is a higher layer signaling message so that it does not affect the physical layer uplink signaling resources. Moreover, this precoding scheme may not need to be updated too often, only if the secondary station has moved so much that the whole topology of the network has completely changed (from the viewpoint of the secondary station).

Figure 5:
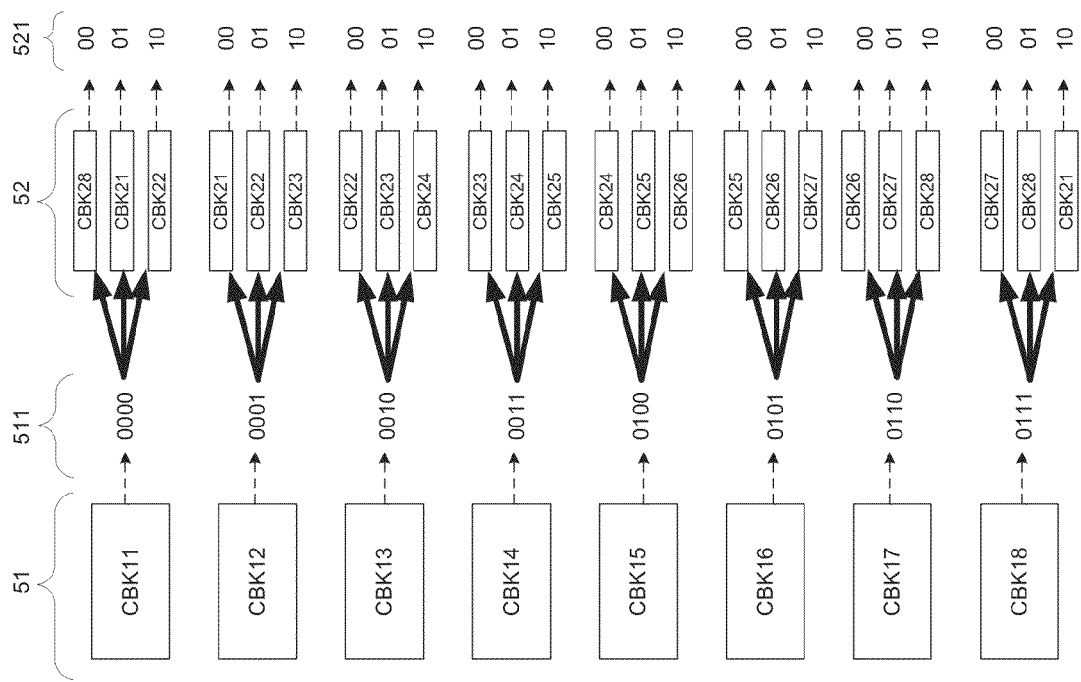
FIG. 5 is a schematically representation of the precoding scheme used in the first embodiment.

In FIG. 5 is illustrated schematically the correspondence between the primary and secondary codebooks. In this precoding scheme, the primary codebook values 51 are linked to subsets of three values 52 of the secondary codebook. In this example, the number of possible values in the subset is constant, however, this may not always be the case and some primary codebook values 51 may be linked to smaller subsets of secondary codebook values 52.

Moreover, FIG. 5 shows the index that will be signaled in signaling messages 411a and 411b. The indexes 511 for the primary codebook 51 are in this example a complete PMI, which can be represented with 3 bits fir the codebook size shown in FIG. 5. Then, for signaling the secondary codebook index, a smaller codeword 521 (here two bits since the subset of precoding matrices can have three values) is needed to be signaled in the signaling message 411b. Thus, that the amount of data used for transmitting the second indicator 521 is less than the amount of data used for transmitting the primary codebook value 511. In variation of this embodiment the index for the primary codebook and the index for the secondary codebook may be jointly transmitted as a combined index, which may be more efficient, for example if the number of entries in the primary codebook and/or secondary codebook is not a power of two, or the number of entries in the secondary codebook varies depending on the entry in the primary codebook.

The secondary station 410 may also report to the network the preferred transmission rank (i.e. the number of spatial channels to be used for the transmission, which is equivalent to the number of antenna ports) and an indication on the channel quality. Channel quality is typically indicated by a channel quality indicator (CQI). This typically indicates a data rate at which packet transmissions can be received with pre-determined error probability.

In accordance with an example of the first embodiment, the secondary station makes channel measurements on the potentially cooperating cells and identifies suitable subsets from the second set of precoding matrices of the secondary codebook (hereinafter 'second set') for association with codebook entries in the first set of precoding matrices of the primary codebook (hereinafter 'first set') in order to establish the precoding scheme of FIG. 5. In another example different from the precoding scheme of FIG. 5, the aim of the secondary station 410 is to find the two best codebook entries from the second set to be associated with a given codebook entry from the first set. Signaling one of two entries from the second set would only require 1 additional bit.

Figure 10:
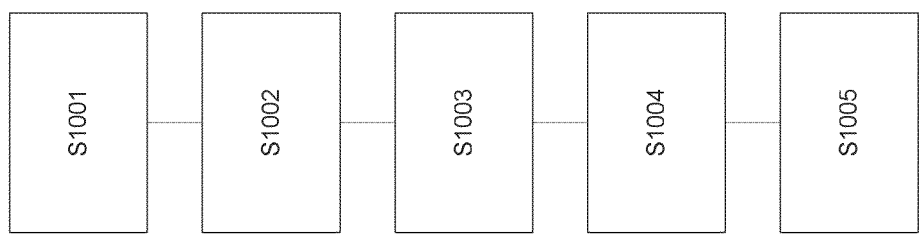
FIG. 10 is a flowchart representing a method of designing a precoding scheme in accordance with the first embodiment of the invention.

FIG. 10 represents one of the possible methods for finding good codebook contents:
In each subframe containing suitable reference symbols, at step S1001 find the data rate for each combination of codebook entry (i.e. corresponding to the combination of the codebook precoding matrices) for from the first set and from the second set.
then, at step S1002, collect statistics of the data rate (e.g. average data rate) for each combination of codebook entry from the first set and from the second set.
and at step S1003, for each codebook entry from the first set, identify the 2 codebook entries selected from the second set which give the highest average data rates.

Thus, this permits to obtain, on the basis of some statistics, a precoding scheme adapted to the situation experienced by the secondary station.

Another method may be the following,
In each subframe containing suitable reference symbols find the combination of codebook entry for from the first set and from the second set which would give the highest bit rate.
for each codebook entry select from the first set, collect statistics for each of the codebook entries selected from the second set (e.g. for a given codebook entry from the first set, record the number of times a given codebook entry is selected from the second set).
For each codebook entry from the first set, identify the most frequently selected codebook entry or entries from the second set.

For either method, the resulting proposed codebook contents are summarized in a precoding scheme that is signaled to the network, preferably as higher layer signaling at step S1004. The network then confirms the proposed precoding scheme and corresponding codebooks (preferably via physical layer signaling) or signals a new one (preferably via higher layer signaling) at step S1005. If no precoding scheme or codebook is indicated by the network a fixed (or pre-determined) precoding scheme is used.

In a variation of this embodiment, the secondary station may signal a recommendation for only part of the precoding scheme. The network may then decide the remaining parts of the precoding scheme and the corresponding codebooks, or the remaining parts may be fixed or pre-determined. For example, the network may signal the contents of part of the codebook and the remaining parts are fixed or pre-determined, then the secondary station uses the methods described above to establish its recommended precoding scheme for the non-fixed parts of the codebook.

In accordance with this first embodiment, the secondary station makes channel measurements on the cooperating cells and identifies suitable subsets from the second set for association with codebook entries in the first set. The resulting codebook design is then signaled to the network.

In case the network requires to change the recommendation made by the UE, the network can either signal confirmation of the UE codebook, or signal the contents of a different one.

The same principle can be used for a codebook with more than 2 entries in the subset from the second codebook and for more than two cooperating cells. However, it is to be noted that if the secondary station location changes, then the codebook could need to be updated. It is possible to configure the secondary station so that upon detection in a big variation of location (either by a change in receive power or by help of embedded GPS, or other geolocalisation monitor), it triggers the establishment of a new precoding scheme.

Figure 6:
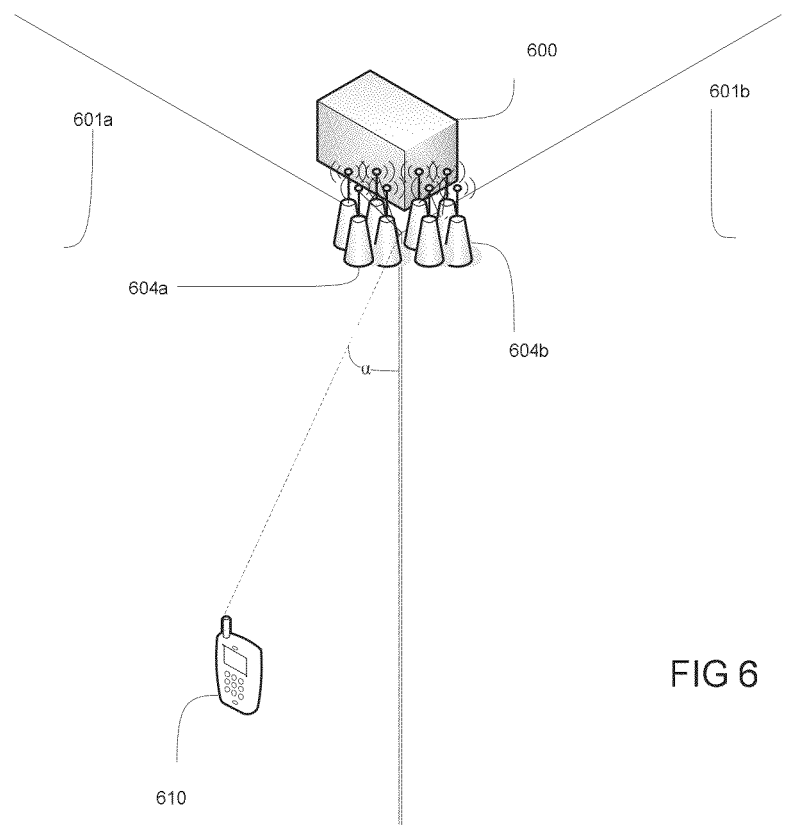
FIG. 6 is a block diagram of a communication system in accordance with a second embodiment of the invention.

In accordance with a second embodiment of the invention illustrated on FIG. 6, the precoding scheme may be based on statements regarding the topology of the network and the situation of the secondary within the cell. In FIG. 6, a secondary station 610 is within a serving cell 601a and communicates with a primary station 600. In an example of this second embodiment of the invention, such a telecommunication system operates under the UMTS specifications or LTE specifications. Accordingly, the primary station 600 may be an eNodeB and the secondary station 610 is a User Equipment (UE). A second cell 601b neighbouring cell 601a is represented on FIG. 6. This cell 601b is controlled by the same primary station 600.

For the sake of clarity only one secondary station is represented, however, a plurality of secondary stations may be within a cell.

Primary station 600 comprises an antenna array divided in two subarrays 604a and 604b respectively dedicated to each respective cell, in this example four antennas per cell. In accordance with a cooperative beamforming mode, the secondary station 610 may receive signals from antennas 604a and 604b dedicated to cells 601a and 601b.

In accordance with this embodiment, a single primary station 600 serves the two cooperating cells with antenna arrays aligned in the same direction, the general direction of the transmission beam is the same for the two antennas as represented on FIG. 6 with the angle α.

As a simple example for a better understanding of this second embodiment, let us consider that the cells 601a and 601b (at the same frequency) supported from the same base station site 600 are using uniform linear antenna arrays, with rank 1 transmission in a free-space/line-of-sight channel (LOS). In this case the optimum precoding coefficients depend mainly on the angle α with respect to the antenna array and the codebook can be based on DFT coefficients (i.e. for a given spatial signature, in this case a unique direction with respect to the antenna array, the corresponding precoding coefficients can be obtained via a Discrete Fourier Transform). For a secondary station 610 likely to benefit from CoMP (Cooperative Multipoint Transmission), i.e. in an area served by the two cells, the angles with respect to the two antenna arrays are likely to be similar. Therefore if the secondary station selects optimum precoding coefficients from a codebook for the serving/first cell, the set of optimum coefficients for the other/second cell is likely to correspond to a similar angle, and therefore the most likely candidates in the codebook for the second cell can be determined according to the codebook entry selected for the serving cell. For example, if the codebook entries are ordered according to angle, then depending on the particular geometrical configuration (for example with antenna arrays 604a and 604b pointing in different directions), the most likely codebook entries for the second cell could be the same or adjacent to the codebook entry for the first cell, or in a mirror position in the codebook. In this case at least one of the codebook entries for the second cell should be identical to the corresponding codebook entry for the first cell.

Thus, a precoding scheme can be established easily based on the statement that the two cells 601a and 601b are controlled by the same primary station site. The same approach can be applied in a slightly different embodiment where the antenna arrays 604a and 604b serve the same cell. This would allow a codebook designed for 4 antennas to be used in a cell with 8 antennas.

For the example given, the precoding codebook entries preferred by the secondary station could be signaled to the primary station in terms of a codebook index (e.g. 4 bits) for the first cell 601a and an offset (e.g. 1 or 2 bit) to indicate a codebook index for the second cell 601b.

For a full codebook search, the secondary station could estimate the achievable data rate with each codebook entry from the first codebook in combination with each offset to the second codebook (e.g. 4+2=6 bits or 64 combinations).

The two main advantages of this second embodiment are the reduced number of bits to signal the codebook indices, compared with the full number of bits for each codebook and the reduced computational complexity from searching a smaller number of codebook combinations. Moreover, there is no need in this embodiment compared with the first embodiment to compute a precoding scheme based on statistics, reducing thus the computation requirement in the secondary station.

Figure 7:
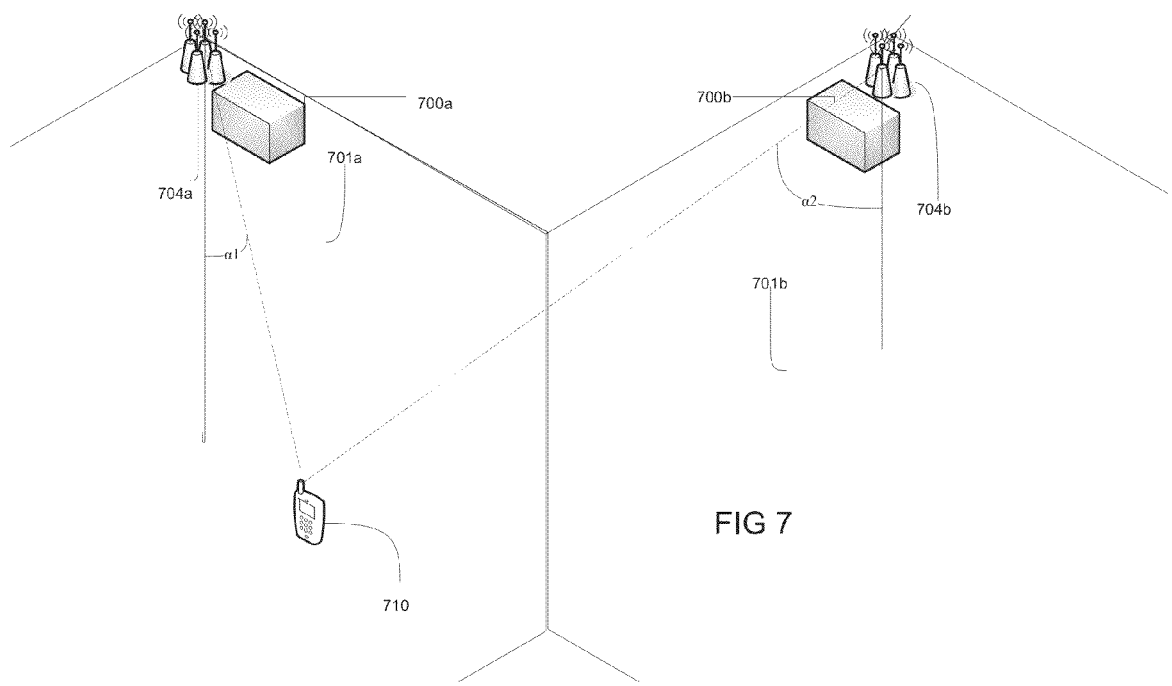
FIG. 7 is a block diagram of a communication system in accordance with another variant of the second embodiment.

A similar approach may be chosen for other configurations of the network. As illustrated in FIG. 7, a secondary station 710 is within a serving cell 701a and communicates with a primary station 700a operating the serving cell 701a. The primary station 700 may be an eNodeB and the secondary station 710 may be a User Equipment (UE). A second cell 701b which is a neighbour to cell 701a is represented on FIG. 7. This cell 701b is controlled by a second primary station 700b.

For the sake of clarity only one secondary station is represented, however, a plurality of secondary stations may be within a cell.

Based on the recognition that the angles α1 and α2 of the beams with a reference are related one to another, it is possible to establish a precoding scheme from the topology of the network.

Let us consider that the cells 701a and 701b (at the same frequency) supported from two base station sites 700a and 700b are using uniform linear antenna arrays, with rank 1 transmission in a free-space/line-of-sight channel (LOS). In this case the optimum precoding coefficients depend mainly on the angle α1 and α2 with respect to the antenna array and the codebook can be based on DFT coefficients. For a secondary station 710 likely to benefit from CoMP, i.e. on the border between two cells, the angles with respect to the two antenna arrays are likely to be related (i.e. with opposite or mirrored values). If the reference is the axis linking the two base station sites, the angle α1 equals approximately −α2 if it is considered that the cells have the same size. Therefore if the secondary station selects optimum precoding coefficients from a codebook for the serving/first cell 701a, the set of optimum coefficients for the other/second cell 701b is likely to correspond to an opposed angle, and therefore the most likely candidates in the codebook for the second cell can be determined according to the codebook entry selected for the serving cell. For example, if the codebook entries are ordered according to angle, then, depending on this particular geometrical configuration, the most likely codebook entries for the second cell could be in a mirror position in the codebook. Thus, it could be given by an offset minus the value of the first codebook index.

For a secondary station in a location that leads to the same or adjacent codebook entries in the second cell, as in FIG. 6, an example of such a precoding scheme could be represented as follows:

| Codebook entry from first codebook (for first cell) | First associated entry from the second set (for second cell) | Second associated entry from the second set (for second cell) |
| --- | --- | --- |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 6 |

This means that, for example if codebook entry 5 is chosen for the first cell (which could be signaled by 3 bits), then either codebook entry 5 or 6 could be used for the second cell (which could be signaled by 1 bit).

For a secondary station in a location that leads to mirror codebook entries in the second cell, as in FIG. 7, an example of such a codebook could be represented as follows:

| Codebook entry from first codebook (for first cell) | First associated entry from the second set (for second cell) | Second associated entry from the second set (for second cell) |
|---|---|---|
| 1 | 8 | 7 |
| 2 | 7 | 6 |
| 3 | 6 | 5 |
| 4 | 5 | 4 |
| 5 | 4 | 3 |
| 6 | 3 | 2 |
| 7 | 2 | 1 |
| 8 | 1 | 3 |

Figure 8:
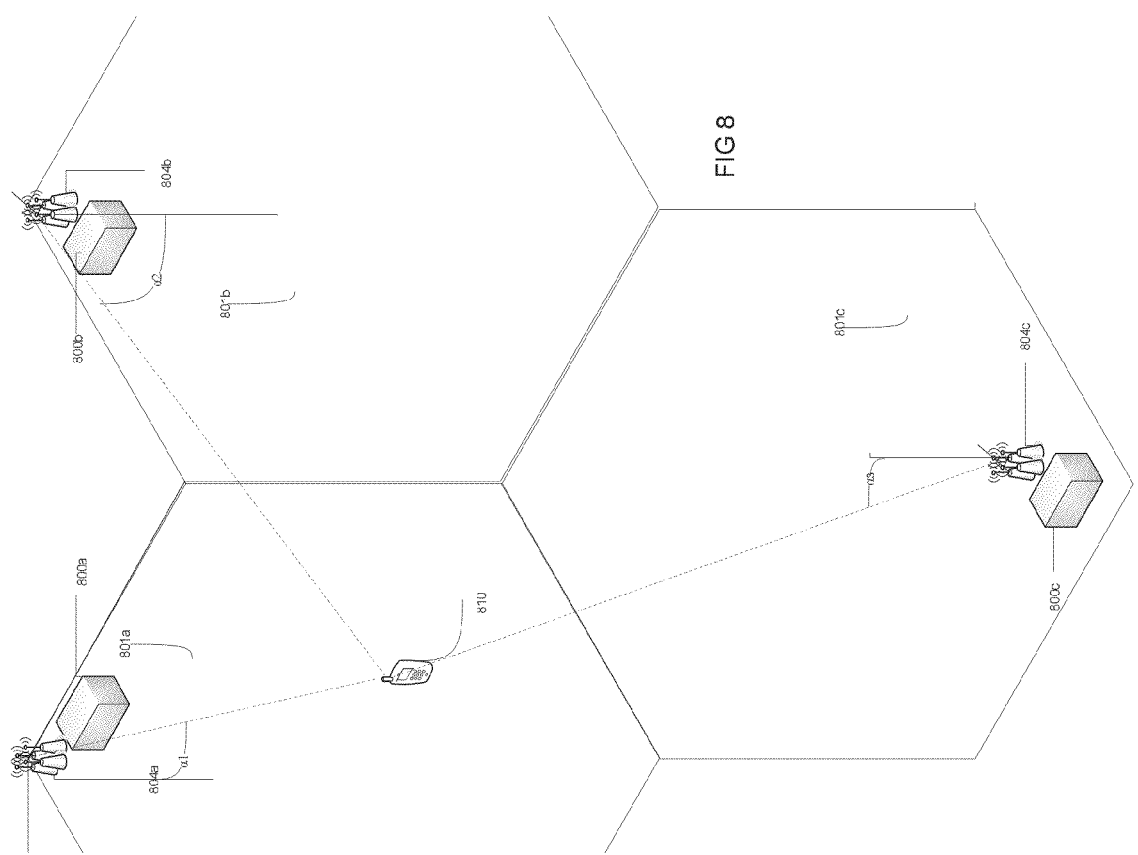
FIG. 8 is a block diagram of a communication system in accordance with still another variant of the second embodiment.

It is to be noted that the same applies for more than two cooperating cells. As shown on FIG. 8, a secondary station 810 receives the cooperating transmission from three cells 801a, 801b, or 801c controlled each by a respective primary station 800a, 800b or 800c.

As in the case of FIG. 7, the angles α1, α2, and α3 are related to one another. As a consequence, the precoding scheme may be predetermined to take this into account. As a first approximation, the codebook entries of the secondary codebook and of the tertiary codebook may be offset by a constant to take into account these relationships.

Then, in accordance with the second embodiment, the values of the first precoding matrix are signaled in a similar way as in the first embodiment which is not repeated for reasons of economy. Furthermore, the values of the second precoding matrix may be signaled as in the first embodiment in the case that there is more than one secondary codebook entry corresponding to the first precoding matrix value. If not, the signaling can be omitted since the primary stations will be aware of the second precoding matrix scheme.

Regarding the signaling of the precoding scheme in the second embodiment, a similar signaling may be carried out as in the first embodiment. However, it is also possible in a variation of the second embodiment to signal the situation that the secondary station is experiencing, i.e. statements on the topology of the network and on the situation of the secondary station in this network. Moreover, since the primary stations are aware of the topology of the network, the primary station may signal to the secondary station a recommended or a default precoding scheme. This permits avoiding the signaling of a complete precoding scheme which may quite large in terms of overhead or signaling.

The optimum association between the first set of codebook entries for the first cell and the set of subsets for the first cell is likely to depend on the deployment configuration and the propagation environment. It would be desirable that this association is identified as in the second embodiment. In general this can be done by making channel measurements on each of the (potentially) cooperating cells at the UE, and reporting them to the network. However, this is likely to result in considerable signaling overhead.

Variations in this embodiment are possible as follows:
In selecting the PMI the UE considers that the first coefficient in the PMI as applied to each cell may be selected to have zero value. For three cells this requires up to 3 bits of signaling to indicate the selected combination of zero value coefficients for 3 cells. In a further variation the case where all the first PMI coefficients are zero is not allowed. In a further variation the case where all the first PMI coefficients are non-zero is not allowed.

In selecting the PMI, the UE considers the following 7 possibilities For each cell, which would require up to 9 bits of signaling to indicate the selected combination for 3 cells. Some combinations may not be allowed (e.g. no transmission on all 3 cells, only one mapping between spatial channels and codewords allowed for the serving cell):
Rank 2 transmission of codeword 1 on spatial channel 1 and codeword 2 on spatial channel 2
Rank 2 transmission of codeword 1 on spatial channel 2 and codeword 2 on spatial channel 1
Rank 1 transmission of codeword 1 on spatial channel 1
Rank 1 transmission of codeword 2 on spatial channel 1
Rank 1 transmission of codeword 1 on spatial channel 2
Rank 1 transmission of codeword 2 on spatial channel 2
No transmission In selecting the PMI, the UE assumes that rank 2 transmission is only carried out by the serving cell. The other cells only transmit with rank 1 (i.e. one spatial channel and one codeword). If the UE prefers Rank 2 transmission according to some criterion, the UE assumes that the serving cell transmits two codewords with Rank 2 according to the value of the selected PMI. Some options for the other cells are:

The UE assume that other cells only transmit the first spatial channel. This means that the possibilities are the same for Rank 1 or Rank 2 transmission from the serving cell: either rank 1 or no transmission from each cooperating cell. These options could be indicated using 4 bits.

The UE selects which spatial channel and which codeword should preferably be transmitted by which of the other cells. The various possibilities (including Rank 1 or Rank 2 transmission from the serving cell) could be signaled with 6 bits:
Rank 1 transmission of codeword 1 on spatial channel 1
Rank 1 transmission of codeword 2 on spatial channel 1
Rank 1 transmission of codeword 1 on spatial channel 2
Rank 1 transmission of codeword 2 on spatial channel 2
No transmission The UE selects a PMI for the first cell, and possible modifications of the PMI in the other—cells according to one of the following variations:
A cyclic shift to be applied to the matrix/vector indicated by the PMI obtain the precoding matrix/vector for each of the other cells.
A phase rotation to be applied to obtain the precoding matrix/vector for each of the other cells.
A cumulative phase rotation to be applied to obtain the precoding matrix/vector for each of the other cells. This would apply a phase slope across the matrix/vector, which is equivalent to an angular shift in the resulting beam pattern.
A combination of antennas for which the phase of the precoding coefficient is rotated to obtain the precoding matrix/vector for each of the other cells. The phase rotation can be fixed, preferably at 180 degrees (i.e. inversion). The amount of phase rotation may be signaled.

In variations of these above first and second embodiments, the secondary index may be replaced by:
a cyclic shift to be applied to a precoding matrix, e.g. the primary precoding matrix, to obtain the second precoding matrix.

a phase rotation to be applied to a precoding matrix, e.g. the primary precoding matrix, to obtain the second precoding matrix;

a parameter of a function for computing the phase rotation to be applied to the precoding coefficients of a given antenna from the antenna number to obtain the second precoding matrix from a precoding matrix, e.g. from the primary precoding matrix;

a combination of antennas for which the phase of the precoding coefficients is rotated to obtain the second precoding matrix from a precoding matrix, e.g. the primary precoding matrix.

Figure 9:
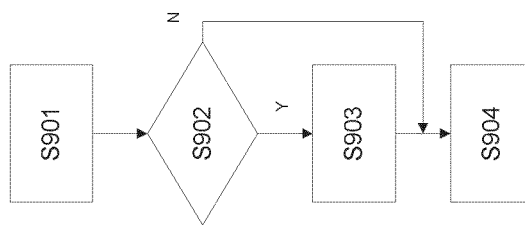
FIG. 9 is a flowchart representing a method of operating a system in accordance with a third embodiment of the invention.

In accordance with the invention, and as represented on FIG. 9, a method is presented in an exemplary system like LTE with four transmit antennas per cell at the eNB, and two receive antennas at the UE.

At step S901, the UE estimates the PMI for the serving cell in a way which is similar to release 8 of UMTS, i.e. the PMI which would give the highest data rate. At step 902, if the UE considers that according to some criterion one or more cooperating cells should be included, then for the serving cell and up to two additional co-operating cells, further information is provided at step S903. This additional information comprises the identity of the preferred cooperating cells (if any), the preferred transmission rank (which also determines the number of codewords) and additional information which modifies how the PMI is to be interpreted for each of the cooperating cells. For rank 1 transmission the PMI is a vector and one codeword would be transmitted at step S904. The signaling is physical layer signaling via PUCCH or PUSCH. For higher rank the PMI is a matrix. In this example, the maximum rank is 2, which implies that two codewords would be transmitted by the eNB in the downlink. The UE may also report a CQI on the assumption that the network transmits according to the PMI and additional information at step S904.

Typically, the specification for systems like LTE makes use of the term "antenna port", which is effectively a virtual antenna which may correspond to a single physical antenna or may be derived by a linear combination of signals from more than one physical antenna. For convenience, we use the term "antenna", but this could also be understood as "antenna port".

In the case of non-DFT codebooks (e.g. for non-LOS channels), it is not necessarily the case that the appropriate entries for the second cell are adjacent to the entry selected for the first cell. In some cases it may be possible to determine the appropriate entries analytically as in the second embodiment. Otherwise they may be determined empirically (e.g. by observation of selected codebook entries in a simulation or in measurements) as in the first embodiment, or some codebook design approach could be used (e.g. brute-force search for a good codebook, or genetic algorithm).

To summarize, the CoMP codebook according to the embodiments of the invention comprises a first set of precoding matrices for the first cell. For the second cell, there is a subset of a second set precoding matrices, said subset being associated with each matrix from the first set of precoding matrices. Each subset may have different members. The second set may have the same members as the first set. And so on for third and further additional cells as required. In the case of rank 1 transmission, the matrices may be vectors.

In accordance with a third embodiment, the precoding scheme may be used as well (or only) by a primary station involved in a cooperative beamforming. In a similar way as the embodiments described previously, the primary station selects a first precoding matrix to signal the precoding applied on the antennas of a first primary station, e.g. itself or another primary station involved in the cooperative beamforming. Then, the precoding of a second primary station may be limited to a subset of precoding matrices (e.g. 1, 2, 3 matrices but less than the whole set of available precoding matrices for the second cell). Then, the precoding of the second cell is chosen in the limited set of precoding matrices and is applied to a primary station involved in the cooperative beamforming. The first primary station may signal the first precoding matrix (by use of a precoding matrix index) and possibly information regarding the second precoding matrix.

The present invention shall not only be construed to the above embodiments and it will be clear for someone skilled in the art that the below variants and examples may be adapted in various implementations of the invention. Some exemplary extensions or alternatives to the above embodiments described below are possible. For some codebooks the first coefficient in the matrix/vector of each entry has the same value (e.g. 1). Since it is unlikely that the optimum value for this coefficient is the same for every cooperating cell, this element can always be selected as "off" in the subsets for the second cell. This may be subject to the condition that the first coefficient is not "off" in the first codebook entry for the first cell. This reduces the number of bits needed to signal the antenna selection information.

In the case of rank 2 transmission (or higher rank), it may be difficult to match the required precoding from two spatial channels from all collaborating cells. Therefore some restrictions or options could be applied:

Rank 2 transmission is only carried out by the serving cell. The other cells only transmit one spatial channel. Some options are that the UE assumes that other cells only transmit the first spatial channel or that the UE signals which spatial channel and which codeword should be transmitted by which cell.

For each cell the secondary station signals from among the following possibilities:

Rank 2 transmission

Rank 1 transmission of codeword 1 on one spatial channel

Rank 1 transmission of codeword 2 on one spatial channel

Rank 1 transmission of codeword 1 on the other spatial channel

Rank 1 transmission of codeword 2 on the other spatial channel

No transmission

It is to be noted that in receiving the resulting downlink transmission the secondary station would assume an appropriate association between DRS and codewords.

Instead of signaling a PMI and a combination of antennas which are switched "off" in each cell, the following possibilities can be signaled, in most cases with a similar number of bits:

The UE can signal a PMI for the first cell and a cyclic shift to be applied to the matrix/vector indicated by the PMI obtain the precoding matrix/vector for each of the other cells.

The UE can signal a PMI for the first cell and a phase rotation to be applied to obtain the precoding matrix/vector for each of the other cells.

The UE may signal a PMI for the first cell and a cumulative phase rotation to be applied to obtain the precoding matrix/vector for each of the other cells. This would apply a phase slope across the matrix/vector, which is equivalent to an angular shift in the resulting beam pattern.

The UE may signal a PMI for the first cell and a combination of antennas for which the phase of the precoding coefficient is rotated to obtain the precoding matrix/ vector for each of the other cells. The phase rotation could be 180 degrees (i.e. inversion). This modification is proposed on the basis that if the contribution of a given antenna to the received signal is detrimental to performance (i.e. leads to destructive interference), then it would be switched "off" in AS-SFN. However, as proposed here, it may be better to reverse the phase and convert destructive interference into constructive interference. The amount of phase rotation could be signaled.

It is to be noted that in all the previous embodiments, the precoding matrix can be understood, as in the case of a rank 1 transmission, as a precoding vector.

The invention is applicable to systems using co-operative beamforming between cells which may include LTE-Advanced. The cells may be located a single base station site, or on different sites, for example femto-cells implemented by fibre radio techniques.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A mobile terminal communicating in a communication system with at least a first station and a second station, the mobile terminal comprising:
 a processor configured to:
  select a first index associated with a first codebook containing at least one precoding scheme associated with communication with the first station; and
  select a second index from a second codebook containing at least one second precoding scheme associated with communication with the second station, wherein the second index is associated with the selected first index; and
 a transmitter configured to transmit the first index to the first station.

2. The mobile terminal according to claim 1, wherein the first codebook and associated second codebook are transmitted to the mobile terminal responsive to the mobile terminal transmitting the first index to the first station.

3. The mobile terminal according to claim 1, wherein the first codebook and the second codebook are prestored in the mobile terminal.

4. The mobile terminal according to claim 1, wherein the transmitter transmits the second index, and wherein an amount of data required for transmitting the first index to the first station is greater than an amount of data required for transmitting the second index.

5. The mobile terminal according to claim 1, wherein the processor further determines a rank of a number of antennas to be used, and the transmitter transmits the determined rank to the first and second stations.

6. The mobile terminal according to claim 1, wherein the processing system further selects a third index associated with the selected first index; and the transmitter transmits the third index to the second station.

7. The mobile terminal according to claim 1, wherein the second index is associated with a precoding scheme that provides a highest average data rate from the second station.

8. The mobile terminal according to claim 7, wherein the third index is associated with a precoding scheme that provides a second highest average data rate from the second station.

9. The mobile terminal according to claim 1, wherein the first index and the second index are associated with precoding schemes that provide a highest transmission bit rate.

10. The mobile terminal according to claim 1, wherein the transmitter transmits the second index to the second station.

11. A method for determining coding schemes in a communication system, the method comprising:
 in a mobile device:
  selecting by a processor of the mobile device, a first precoding matrix from a first set of precoding matrices, the first set of precoding matrices associated with communication with a first base station;
  selecting by the processor of the mobile device, a second precoding matrix from a subset of a second set of precoding matrices, the second set of precoding matrices being associated with communication with a second base station, wherein the subset of the second set of precoding matrices is associated with the selected first precoding matrix; and
  transmitting by a transmitter of the mobile device, a first index corresponding to the first precoding matrix to the first base station.

12. The method of claim 11, wherein the first set of precoding matrices and at least the subset of the second set of matrices are transmitted to the mobile device responsive to the mobile device transmitting the first index corresponding to the first precoding matrix to the first base station.

13. The method of claim 11, wherein the first set of precoding matrices and at least the subset of the second set of matrices are prestored in the mobile device.

14. The method of claim 11, wherein the the transmitter transmits a second index associated with the second precoding matrix.

15. The method of claim 14, wherein an amount of data for transmitting the first index is greater than an amount of data for transmitting the second index.

16. The method of claim 11, wherein the processor determines a rank of a number of antennas to be used and transmits the determined rank representing the number of antennas to be used to the first and second stations.

17. The method of claim 11, wherein the selected second precoding matrix provides a highest average data rate from the second base station.

18. The method of claim 11, wherein the first and second precoding matrices, provide a highest transmission bit rate.

19. The method of claim 11, wherein the method causes the processor to transmit a relationship of the first set of precoding matrices and at least the subset of the second set of precoding matrices.

20. The method of claim 14, wherein the first index and the second index are transmitted as a combined index.

21. The method of claim 11, wherein the processor determines statistics associated with data rates for the first precoding matrix and the second precoding matrix.

22. The method of claim 11, wherein the processor determines a most frequently selected second precoding matrix for each of the first set of precoding matrices.

23. The method of claim 11, wherein the first base station and the second base station are components of a common station.

24. The method of claim 23, wherein the selected first precoding matrix is comparable to the selected second precoding matrix.

25. The method of claim 14, wherein the first index is represented by a first value and the second index is represented by an offset value from the first value.

26. A mobile device in communication with a first primary station and a second primary station, the mobile device comprising:
- a processor configured to:
  - determine a first coding scheme for communication with the first primary station, the first coding scheme represented by a first value associated with a plurality of first coding schemes;
  - determine a second coding scheme for communication with the second primary station, the second coding scheme represented by a second value associated with a plurality of second coding schemes, the plurality of second coding schemes being associated with the first coding scheme; and
- a transmitter configured to transmit the first and second values.

27. The mobile device of claim 26, wherein the first value is an index into a list of the plurality of first coding schemes and the second value is an index into a list of the plurality of second coding schemes associated with the first coding scheme.

28. The mobile device of claim 26, wherein the first value is an index into a list of the plurality of first coding schemes and the second value is an offset value from the first value.

29. The mobile device of claim 26, wherein the first coding scheme and the second coding scheme are determined to achieve a highest data rate of transmission.

30. The mobile device of claim 26, wherein determining the first coding scheme is based on statistics associated with measured date rates associated with the plurality of first coding schemes.

31. The mobile device of claim 26, wherein the processor determines a rank representing a number of antennas to be used, and the transmitter transmits the rank.

32. The mobile device of claim 14, wherein an amount of data for transmitting the first value is greater than an amount of data for transmitting the second value.

* * * * *